March 21, 1939. A. L. FREEDLANDER ET AL 2,151,095
BELT CONNECTOR
Filed June 12, 1936   2 Sheets-Sheet 1
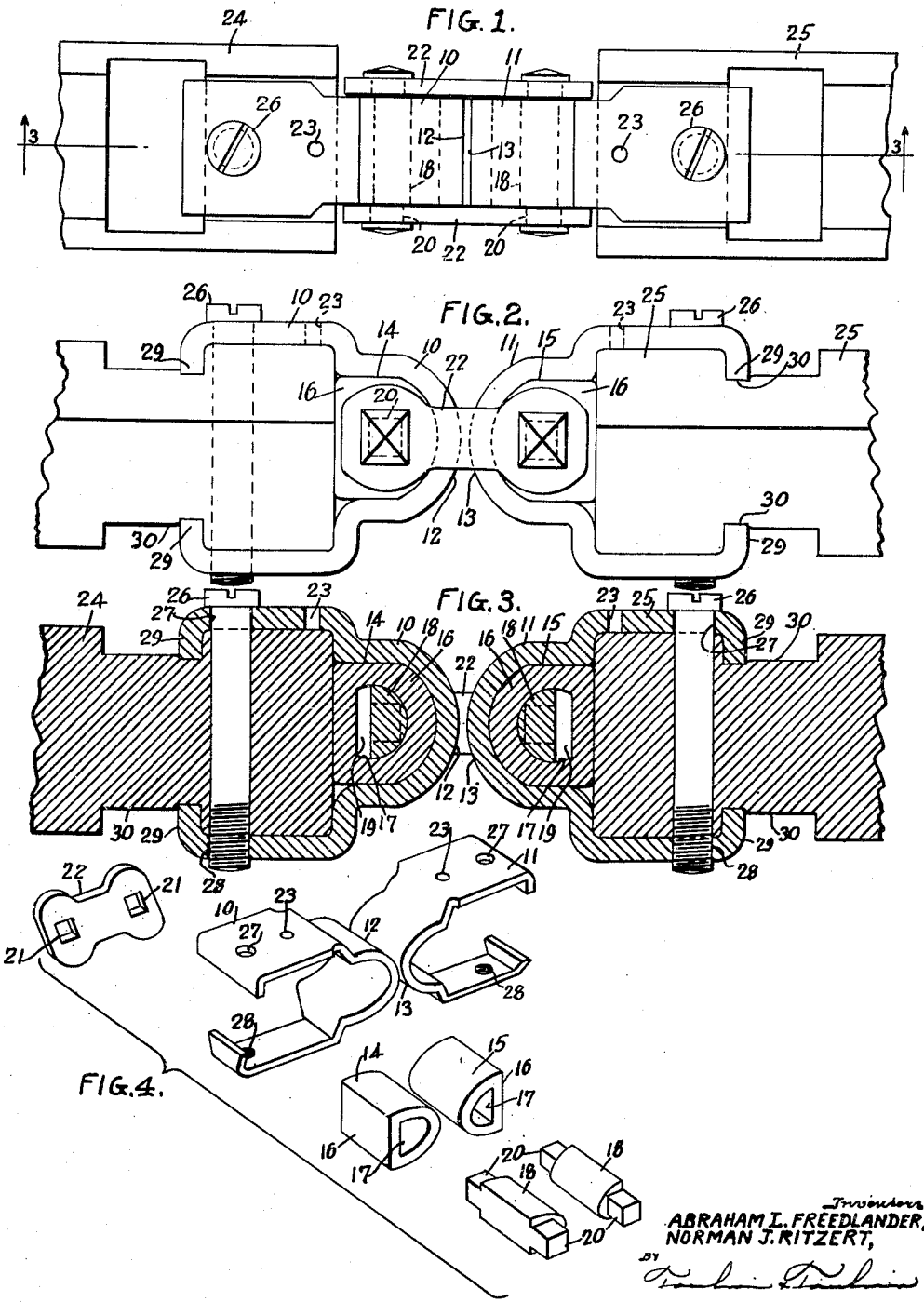

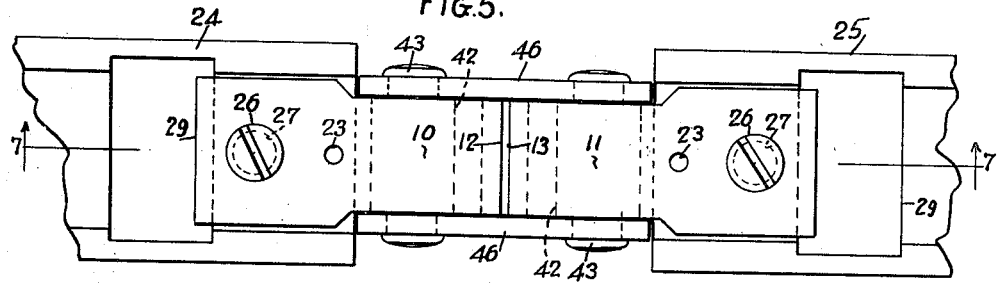
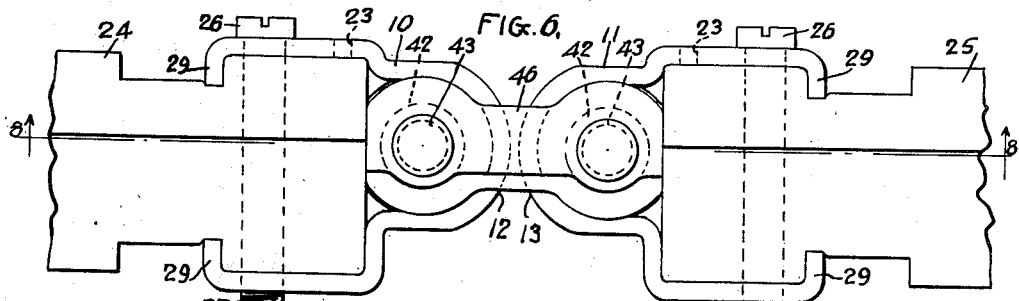
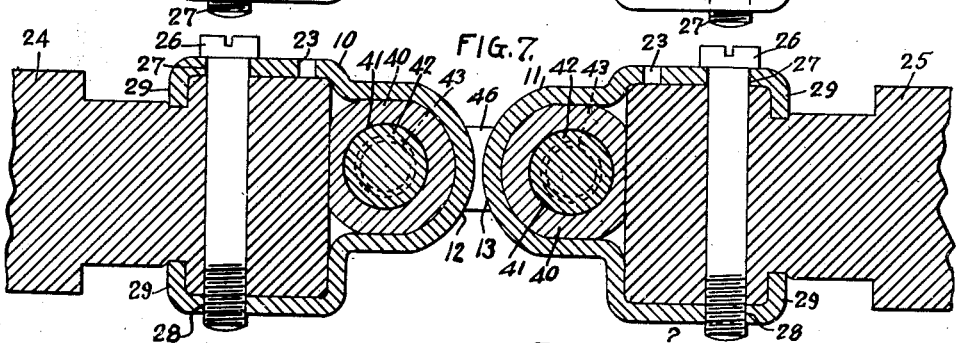
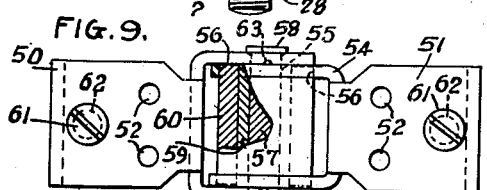
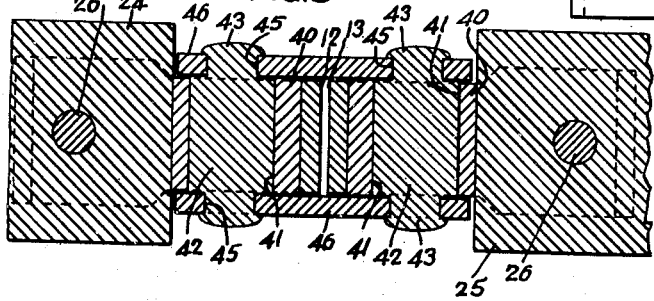
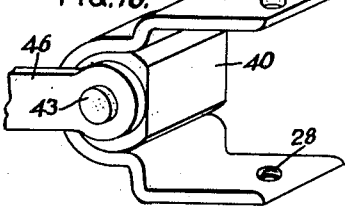

Patented Mar. 21, 1939

2,151,095

UNITED STATES PATENT OFFICE 2,151,095

BELT CONNECTOR

Abraham L. Freedlander and Norman J. Ritzert, Dayton, Ohio, assignors to The Dayton Rubber Mfg. Company, Dayton, Ohio, a corporation of Ohio Application June 12, 1936, Serial No. 84,916

8 Claims. (Cl. 24—33)

This invention relates to belt connectors, and in particular, to belt connectors having bearing members interposed between the ends of the belt.

One object of this invention is to provide a belt connector having a pair of spaced bearing members interconnected by link means in such a manner as to permit relative tilting of the ends of the belt at two pivot axes.

Another object is to provide a belt connector of this type, in which the bearing member is caused to engage a D-shaped bearing bushing, thereby shortening the distance from the fulcrum point to the screw hole of the belt strap, and consequently reducing the leverage on the belt at the screw hole or in back of the belt connector.

Another object is to provide a belt connector of the above type, in which the bearing bushing consists of a bearing material impregnated with a lubricant.

Another object is to provide a belt connector consisting of a pair of separated straps with bearing means held between the nose portion of each strap, and with connecting means interconnecting the two bearing portions in such a manner as to permit tilting of the belt ends around two axes spaced apart from one another.

Another object is to provide a belt connector with double pivot axes, and with straps or clamps having interconnected bearing means in the nose portions thereof, the bearing means consisting of a D-shaped bearing bushing within which is a roughly hemi-cylindrical bearing member secured at its outer ends to the connecting means between the two bearing members, this connecting means being, for example, a pair of links.

Another object is to provide a belt connector with belt clamps spaced apart from one another, and with a bearing bushing in the nose portion of each belt clamp, a bearing member within each bearing bushing, and means for securing the bearing members to a connecting means interconnecting the spaced bearing members.

In the drawings:

Figure 1 is a top plan view of the belt connector of this invention shown as interconnecting the ends of a belt.

Figure 2 is a side elevation of the belt connector assembly shown in Figure 1.

Figure 3 is a central, vertical section along the line 3—3 of Figure 1.

Figure 4 is a perspective view of the principal parts of the belt connector shown in Figure 1, laid out separately to show the component parts, one of the connecting links being omitted for clearness of showing.

Figure 5 is a top plan view of a modification.

Figure 6 is a side elevation of the modification shown in Figure 5.

Figure 7 is a central, vertical section taken along the line 7—7 of Figure 5.

Figure 8 is a horizontal section taken along the line 8—8 of Figure 6.

Figure 9 is a top plan view of a modified form of belt connector employing a tubular roller surrounding a connecting member, and engaging a bearing bushing.

Figure 10 is a perspective view of the right-hand half of the belt connector shown in Figure 6, with the bent ends of the straps omitted.

Referring to the drawings in detail, Figure 1 shows one embodiment of the belt connector of this invention as consisting of a pair of belt clamps or straps 10 and 11, having nose portions 12 and 13 spaced apart from one another. Each nose portion 12 and 13 is slightly flattened, as at 14 and 15, above and below so as to provide a space to receive an approximately D-shaped bearing bushing 16, the upper and lower portions of which engage the flattened parts 14 and 15 to prevent rotation. The bearing bushing 16 is provided with a bore 17 of D-shape cross section, adapted to receive a bearing member 18 of approximately hemi-cylindrical cross section. As the bore 17 is somewhat greater than a hemi-cylinder in cross section, a space 19 is provided between the back face of the bearing member and the back wall of the bore to provide room for oscillation of the bearing member 18. The opposite ends 20 of the bearing member 18 are formed in a manner convenient to anchor the bearing member. In the drawings the ends 20 are shown as squared in order to fit into square apertures 21 in the opposite ends of link members 22.

The belt clamps 10 are preferably made of an aluminum alloy to provide lightness in weight, and the weight may be further reduced by the provision of additional holes 23 in the clamps. The bearing bushing 16 is preferably made of a bearing composition having a lubricant impregnated therein, such as graphite or lubricating oil or grease. Such bearing compositions are known to those skilled in the art. The bearing member 18 is preferably made of a hardened steel, such as drill rod, so as to provide long life and the minimum wear during the use of the belt connector.

In the assembly of the belt connector shown in Figure 1, the D-shaped bearing bushings 16 are inserted in the nose portions 12 and 13 of the belt clamps 10 and 11. The bearing members 18 are passed therethrough and the links 22 snapped into position over the squared ends 20 of the bearing members 18. The ends 20 are then upset or peened so as to enlarge the heads and anchor the links 22 firmly to the bearing members 18.

In attaching the belt connector shown in Figure 1 the clamps 10 and 11 are inserted over the ends 24 and 25 of the belt, and the clamping screw 26 inserted through the hole 27 in the top of the belt so as to pass through the belt and engage the threads in the threaded hole 28 in the bottom part of the belt clamp. The free ends of the belt clamps 10 and 11 may be bent over, as at 29, so as to engage notched portions 30 in the belt. The latter may be of any suitable cross section and provided with notches on one side or on both sides, as shown. The belt illustrated in Figure 1 is of hexagonal cross section, but it will be obvious that belts of other cross section, such as trapezoidal cross section, may also be employed.

In the operation of the belt connector shown in Figure 1 the belt ends 24 and 25 are permitted to flex or tilt relatively to one another in passing over pulleys of different sizes. In so tilting the nose portions 12 and 13 and the bearing members 18 therein move relatively to one another about the spaced axes 31 and 32 thereof. The links 22 serve to maintain the connection therebetween. As the belt is operated over a short period of time the warmth generated by the friction causes the lubricant to be released from the bearing bushing 16 and to exude onto the walls of the bore 17, thereby providing lubrication for the bearing member 18. It will be understood, of course, that a plain bearing bushing 16 may be employed instead of the lubricant-impregnated bearing bushing, but such plain bearing members, of course, require external lubrication by some suitable means.

In the modified form of belt connector shown in Figures 5 to 8, the belt clamps are of similar form and are similarly designated. The bearing bushings 40 are also similar in composition and shape, but are thicker from front to rear so as to permit the bore 41 therethrough to be completely cylindrical. Within the bore 41 is arranged a hollow cylindrical bearing member 42 having reduced end portions 43. The ends 43 of this bearing member are cupped, as at 44, and pass through holes 45 in the opposite ends of link members 46, the ends 43 being upset to hold the assembly together.

The assembly of this modified form of belt connector is similar to that of the form previously described in connection with Figure 1, and its attachment to the belt ends follows in a similar manner. In the operation of the modified belt connector the bearing members 42 partially rotate as the opposite nose portions 12 and 13 tilt relatively to one another. The friction thus generated brings out the lubricant impregnated in the bearing bushing 40, in a manner similar to that previously described.

It will be further understood that the belt connector clamps may be drilled in additional places other than at the holes 23 in order to further lighten the weight of the belt connector. These holes 23 also provide the additional feature of giving additional anchorage to the belt ends. As the upper and lower portions of the belt clamps 10 and 11 are drawn together by the screw 26, the belt portions immediately adjacent the holes 23 will bend to squeeze into these holes, thus giving the additional anchorage mentioned. It will be further understood that the bent portions or ears 29 on the free ends of the belt clamps 10 and 11 may be provided either at the top and bottom, as shown, or on the top only or bottom only, or else they may be eliminated entirely, according to the particular kind of belt which is being used.

The modified belt connector shown in Figure 9 is provided with straps or clamps 50 and 51, having holes 52 therein for the same purpose as the holes 23 in the previously described belt connectors. The straps 50 and 51 are provided with interengaging side portions 53 and 54, respectively. The side portions of the clamp 50 are provided with aligned holes 55. The side portions 54 of the clamp 51, however, are provided with larger aligned holes 56. Through the holes 55 passes a connecting member 57.

Surrounding the connecting member 57 is a tubular roller 59 of hardened steel, or other suitable material, and surrounding the latter is a bearing bushing 60 of a self-lubricating type, preferably. The ends of the bearing bushing 60 are held within the holes 56 in the side portions 54 of the belt clamp 51. The bearing bushing 60 may consist of an alloy or material having a lubricant impregnated therein, such as a petroleum derivative or graphite. If necessary the bearing bushing 60 may be surrounded by an additional sleeve, where the bearing bushing material is incapable of self-support. The latter condition occasionally arises in bearing bushings formed of babbitt impregnated with graphite. The belt connector shown in Figure 9 is attached to the belt by means of the usual screws 61, passing therethrough by way of the holes 62.

The operation of the belt connector shown in Figure 9 is similar to that of the other belt connectors previously described, except that the connecting member 57 performs the connecting function, whereas the hardened steel roller 59 performs the function of engaging the bearing bushing 60. It will be obvious that means other than the enlargement of the heads 58 may be used to secure the connecting member 57 in position. In order to prevent relative rotation between the connecting member 57 and the tubular member 59, the latter is provided with radial ridges 63 which bite into the side portions 53 of the belt clamp 50.

It will be understood that we desire to comprehend within our invention such modifications as come within the scope of the claims and the invention.

Having thus fully described our invention, what we claim as new and desire to secure by Letters Patent, is:

1. A belt connector comprising a pair of spaced belt clamps, a bearing bushing of approximately D-shaped cross section associated with each belt clamp, a bearing member within each bearing bushing and having its ends projecting therefrom, said bearing bushings and said bearing members having mating bearing surfaces, and link means interconnecting the projecting ends of the bearing members.

2. A belt connector comprising a pair of spaced belt clamps, a bearing bushing of approximately D-shaped cross section associated with each belt clamp, a bearing member within each bearing bushing, said bearing bushings and said bearing members having mating bearing surfaces, link means interconnecting said bearing members at their opposite ends, and means for securing said bearing members to said link means, each bearing bushing having flattened portions engaging correspondingly flattened portions on the nose portion of the adjacent belt clamp.

3. A belt connector comprising a pair of spaced belt clamps, a bearing bushing of approximately D-shaped cross section associated with each belt clamp, a bearing member within each bearing bushing, said bearing bushings and said bearing members having mating bearing surfaces, and link means interconnecting the opposite bearing members at their opposite ends, each bearing bushing having oppositely disposed flattened portions engaging correspondingly flattened portions on the nose portion of the adjacent belt clamp and having another flattened portion facing the adjacent belt end.

4. A belt connector comprising a pair of spaced belt clamps, a bearing bushing of approximately D-shaped cross section associated with each belt clamp and having a bore of circular cross section therethrough, a bearing member within each bearing bushing, said bearing bushings and said bearing members having mating bearing surfaces, and link means interconnecting the opposite bearing members at their opposite ends.

5. A belt connector comprising a pair of spaced belt clamps, a bearing bushing of approximately D-shaped cross section associated with each belt clamp and having a bore of circular cross section therethrough, a bearing member of circular cross section within each bearing bushing, said bearing bushings and said bearing members having mating bearing surfaces, and link means interconnecting the opposite bearing members at their opposite ends.

6. A belt connector comprising a pair of spaced belt clamps, a bearing bushing of approximately D-shaped cross section associated with each belt clamp, said bearing bushing having a cutaway portion adjacent the end of the belt, a bearing member within each bearing bushing, and connecting means interconnecting said bearing members whereby said belt ends serve as resilient abutments for said bearing bushings.

7. A belt connector comprising a pair of spaced belt clamps, a bearing bushing of approximately D-shaped cross section associated with each belt clamp, said bearing bushing having a flattened portion adjacent to and adapted to engage the end of the belt, a bearing member within each bearing bushing, and links interconnecting said bearing members.

8. A belt connector comprising a pair of spaced belt clamps, a bearing bushing of approximately D-shaped cross-section associated with each belt clamp, said bearing bushing having a flattened portion adjacent to and adapted to engage the end of the belt, a bearing member within each bearing bushing, and links interconnecting said bearing members, said bearing bushings and said bearing members having mating bearing surfaces.

ABRAHAM L. FREEDLANDER.
NORMAN J. RITZERT.